United States Patent [19]

Weghaupt

[11] 4,297,603
[45] Oct. 27, 1981

[54] ARRANGEMENT FOR COOLING THE ROTOR OF AN ELECTRIC MACHINE WITH A SUPERCONDUCTING FIELD WINDING

[75] Inventor: Erich Weghaupt, Mulheim an der Ruhr, Fed. Rep. of Germany

[73] Assignee: Kraftwerk Union Aktiengesellschaft, Mulheim an der Ruhr, Fed. Rep. of Germany

[21] Appl. No.: 94,432

[22] Filed: Nov. 15, 1979

[30] Foreign Application Priority Data

Nov. 15, 1978 [DE] Fed. Rep. of Germany ....... 2849602

[51] Int. Cl.³ .............................................. H02K 9/00
[52] U.S. Cl. ..................................... 310/53; 310/64; 310/261
[58] Field of Search ................ 310/10, 40, 52, 58, 310/61, 64, 54, 261, 53; 62/505

[56] References Cited

U.S. PATENT DOCUMENTS

| | | | |
|---|---|---|---|
| 3,809,933 | 5/1974 | Sugawara | 310/52 |
| 4,123,677 | 10/1978 | Laskaris | 310/64 |
| 4,164,671 | 8/1979 | Gamble | 310/52 |
| 4,204,134 | 5/1980 | Fritz | 310/261 |

FOREIGN PATENT DOCUMENTS 2442277 3/1976 Fed. Rep. of Germany ........ 310/52

*Primary Examiner*—R. Skudy
*Attorney, Agent, or Firm*—Herbert L. Lerner; Laurence A. Greenberg

[57] ABSTRACT

Arrangement for cooling the rotor of an electric machine, including a superconducting field winding, a cold shield surrounding the winding, and a mixing chamber containing a phase mixture of coolant fed in, a stream of liquid coolant for cooling the winding and a stream of partially evaporated coolant for cooling the cold shield, the second stream being conducted through the cold shield and returned from the machine in an outer loop, the first stream being conducted through inner loops, through cooling canal sections of conductors, and returned to the chamber, the coolant in the loops being transported by the self-pumping effect of the rotor, the inner loops having radial entrance and exit branches distributed over the length and circumference of the rotor and winding, chamber sections associated with the inner loops, the chamber sections having an axial length and radial height forming pockets leading into the entrance branches for coolant which is cooler than the average temperature of the liquid phase and produced by evaporation at liquid level, a device for fanning-up a directional loop flow from weight and pressure differences of the canal sections of the inner loops, the chamber sections being distributed over the axial length and inner circumference of the rotor with the placement of the inner loops, and being disposed concentrically about the longitudinal axis of the chamber, each of the chamber sections having an entrance spaced from the axis, and an exit near an inner loop.

6 Claims, 8 Drawing Figures

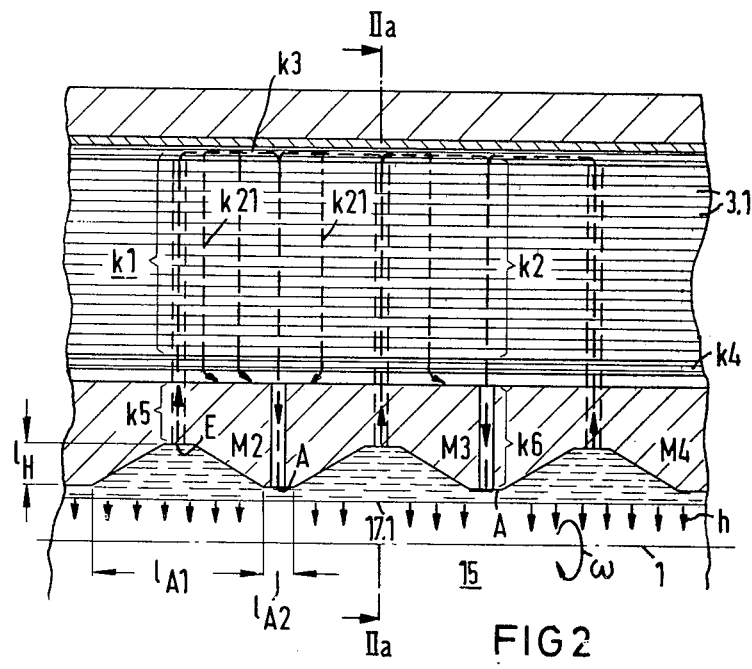
FIG 2
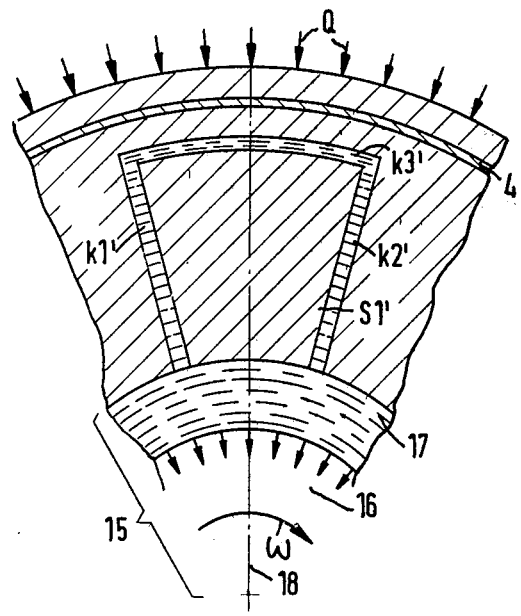
FIG 2a
FIG 3

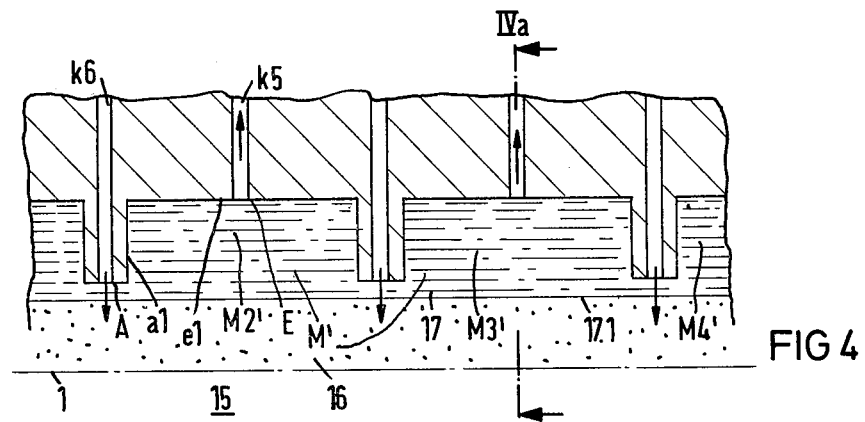
FIG 4
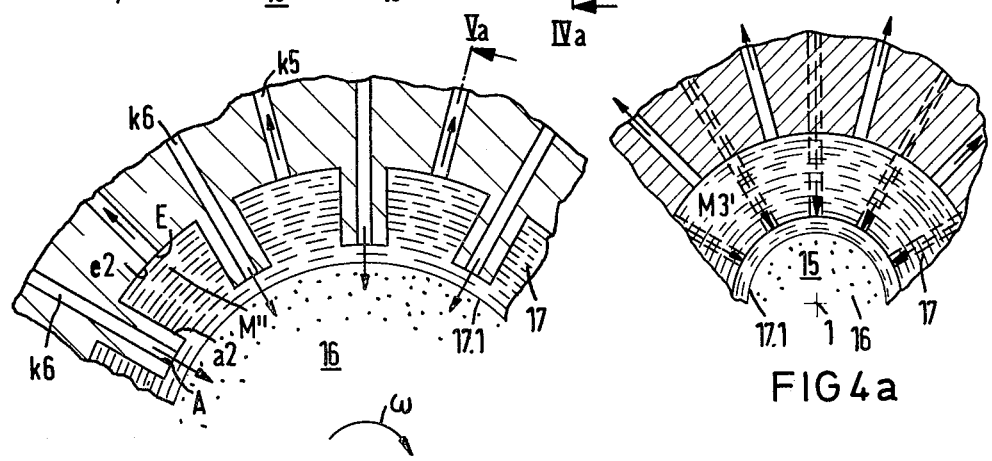
FIG 5
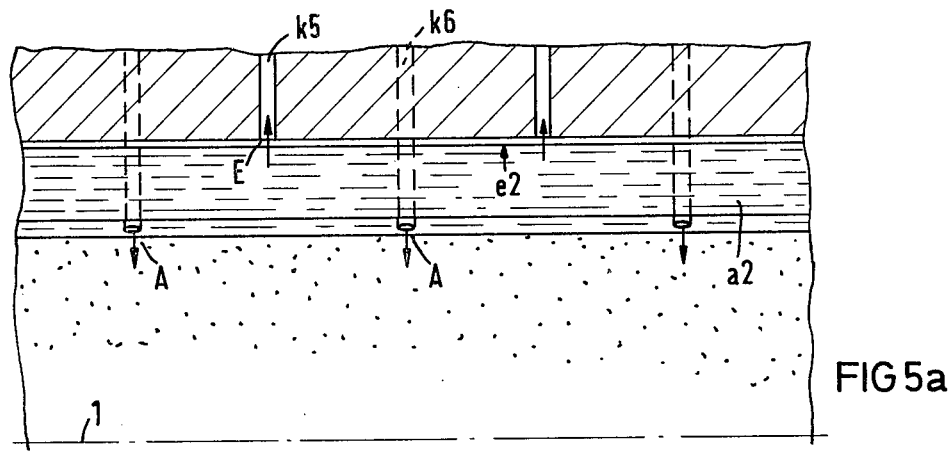
FIG 4a
FIG 5a

ARRANGEMENT FOR COOLING THE ROTOR OF AN ELECTRIC MACHINE WITH A SUPERCONDUCTING FIELD WINDING

The invention relates to an arrangement for cooling the rotor of an electric machine, especially of a turbo-generator, with a super-conducting field winding which is surrounded by at least one cold-shield, and a co-rotating mixing chamber which contains a phase mixture of a coolant, particularly helium fed-in from the outside of the machine. From the coolant feed, a first stream of liquid coolant for cooling the field winding and a second coolant stream with at least partially evaporated coolant for cooling the cold-shield are taken off. The first coolant stream, conducted through the field winding, is returned into the mixing chamber in an inner loop and the second coolant stream, conducted through the cold-shield, is returned from the machine in an outer loop, wherein the self-pumping effect of the rotating rotor is utilized for transporting the coolant through the inner and the outer loop.

Such an arrangement has already been proposed in the earlier filed U.S. Application, Ser. No. 944,391, filed on or about Sept. 21, 1978. In that disclosure, an axial cooling system for cooling the field winding conductors according to the forced-circulation system is provided, i.e., the coolant enters the cooling ducts of the field winding conductors at one end face of the field or exciter winding in the vicinity of the transverse conductors, flows through them and the axial conductor portions and leaves in a warmed-up state in the vicinity of the transverse conductors of the other end face. Such forced-circulation axial cooling requires a relatively large pressure drop between the input and output side of the field winding and thus, considerable technical means for the coolant-connecting head, especially its sealing from the outside, and the refrigeration system which as a rule furnishes liquid helium. In addition, hot spots in the winding that may occur cannot be cooled individually; this depends on the coolant throughput of the longitudinal duct in question.

It is accordingly an object of the invention to provide an arrangement for cooling the rotor of an electric machine with a superconducting field winding, which overcomes the hereinafore mentioned disadvantages of the heretofore know devices of this general type, in such a manner that a smaller pressure gradient and a minimal amount of coolant supplied from outside for cooling the superconducting field winding can be worked with, and reduced cooling capacity or a simpler refrigeration unit is therefore sufficient. In addition, it should be possible to provide for largely individual cooling of parts of winding conductors and heat pockets that may occur inside the rotors. A coolant subflow should be more or less strongly excitable toward these areas in a failsafe manner.

With the foregoing and other objects in view there is provided, in accordance with the invention, an arrangement for cooling the rotor of an electric machine, especially a turbo generator, comprising a superconducting field winding, at least one cold shield surrounding the field winding, and a co-rotatable mixing chamber containing a phase mixture of coolant particularly helium, fed in from outside the rotor or machine, the coolant mixture having a liquid level and branching into a first stream of liquid coolant for cooling the field winding and a second stream of at least partially evaporated coolant for cooling the cold shield, the second coolant stream being conducted through the cold shield and returned from the machine in an outer loop, the first coolant stream being conducted through a mutliplicity of parallel-connected open thermal-syphon inner loops, through cooling canals subdivided into corresponding cooling canal sections of winding conductors of the field winding, and returned to the mixing chamber, said coolant in the inner and outer loops being transported by the self-pumping effect of rotation of the rotor, the inner loops having radial entrance and exit branches distributed over the length and circumference of the rotor and field winding, mixing chamber sections associated with the respective inner loops, the mixing chamber sections having a given axial length and radial height forming collecting pockets leading into the entrance branches for coolant which is colder than the average temperature of the liquid phase and produced by evaporation at the liquid level, means for fanning-up a directional thermal-syphon loop flow from the weight and pressure differences between the radial coolant canal sections of the respective inner loops, the mixing chamber sections being distributed over the axial length and inner circumference of the rotor in accordance with the placement of the thermal-syphon inner loops, and being disposed concentrically about the central longitudinal axis of the mixing chamber of the rotor, each of the mixing chamber sections having at least one loop entrance point spaced from the axis and at least one loop exit point in vicinity of a thermal-syphon inner loop.

To solve the stated problem, the invention thus starts out from a thermal-syphon type of cooling system for a generator rotor, especially a turbo-generator rotor with a superconducting field winding, and more specifically one which comprises a multiplicity of thermal-syphon loops which are each assigned to corresponding cooling duct sections of the field winding. A thermal-syphon-type cooling system permits the utilization of the rotation for lowering the coolant temperature inside the rotor by about 1 K. This effect is now utilized in such a manner that a defined flow direction of the coolant, particularly helium, is forced in all thermal-syphon loops of the cooling system. According to the invention, the directional helium flow is initially established due to the rotation of the rotor, and independently of electrical losses in the superconducting field winding. If a superconducting field winding of a generator rotor, especially a turbo-generator rotor, is to be cooled with liquid helium over many thermo-syphon loops opening up the entire winding, a defined flow direction is necessary in each individual loop so as to prevent undesirable disturbing effects in adjacent loops. Such effects include counterflow, which can stop the flow and therefore lead to a failure of the cooling in the worst case. The losses in the superconducting field winding are normally hardly appreciable (minor losses of a few watts are produced at conductor joints and at the field current leads). Because of this, the result obtained is surprising, in that the behavior of the thermal-syphon loops in the rotating rotor can be calculated in advance in the thermal-syphon loop cooling system according to the invention.

In accordance with another feature of the invention, there are provided circular slots formed in the mixing chamber of the rotor for enlarging the mixing chamber and forming the mixing chamber sections, the circular slots being disposed coaxially to the longitudinal axis of the mixing chamber and having approximately conically tapered axial cross sections, the loop exit point being disposed in the axial vicinity of the greatest axial width of the mixing chamber section, and the loop entrance point being disposed in the axial vicinity of the smallest radial width of the mixing chamber section.

In accordance with a further feature of the invention, the mixing chamber sections are formed by circular slots of trapezoidal axial cross section.

In accordance with an added feature of the invention, there are provided substantially rectangular circular slots formed in the mixing chamber to form the mixing chamber sections, ring extensions left standing between respective adjacent mixing chamber sections, and a radially outer ring wall for the mixing chamber sections, the canals for the loop entrance being conducted from the radially outer ring wall through the body to the winding, and the canals for the loop exits being conducted within the ring extensions, from the winding radially inwardly to the respective mixing chamber section.

In accordance with an additional feature of the invention, there are provided substantially trapezoidal or sector shaped axial slots formed in the mixing chamber to form the mixing chamber sections, a radially outer transverse wall for the mixing chamber sections (axial mixing chambers), and axial webs left standing between respective tangentially adjacent mixing chamber sections, the canals for the loop entrances being conducted from the transverse wall through the body to the winding, and the canals for the loop exits being conducted within the axial webs radially inwardly to the respective mixing chamber section.

In accordance with a concomitant feature of the invention, the rotor has an axial coil having heads, the mixing chambers in vicinity of said axial coil of the rotor are formed as ring mixing chambers following each other in axial direction, and the ring mixing chambers follow each other in circumferential direction in vicinity of the coil heads.

Other features which are considered as characteristic for the invention are set forth in the appended claims.

Although the invention is illustrated and described herein as embodied in arrangement for cooling the rotor of an electric machine with a superconducting field winding, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings in which:

FIG. 2 is an enlarged view of the rotor section according to FIG. 1;

FIG. 2a is a cross-sectional view of FIG. 2, taken along the line IIa—IIa thereof, in the direction of the arrows;

FIG. 3 is a cross-sectional view of an example of a sector of a rotor having an open thermal-syphon loop construction which serves merely for illustration purposes but is otherwise unsuitable in connection with the present invention;

FIG. 4 is a diagrammatic sectional view of a second embodiment example of the invention for the thermal-syphon loops with mixing chamber sections of rectangular cross section in a presentation corresponding to FIG. 3, but leaving out the outer rotor body which is constructed as in FIG. 3;

FIG. 4a is a cross-sectional view of FIG. 4, taken along the line IVa—IVa thereof, in the direction of the arrows;

Figure 1:
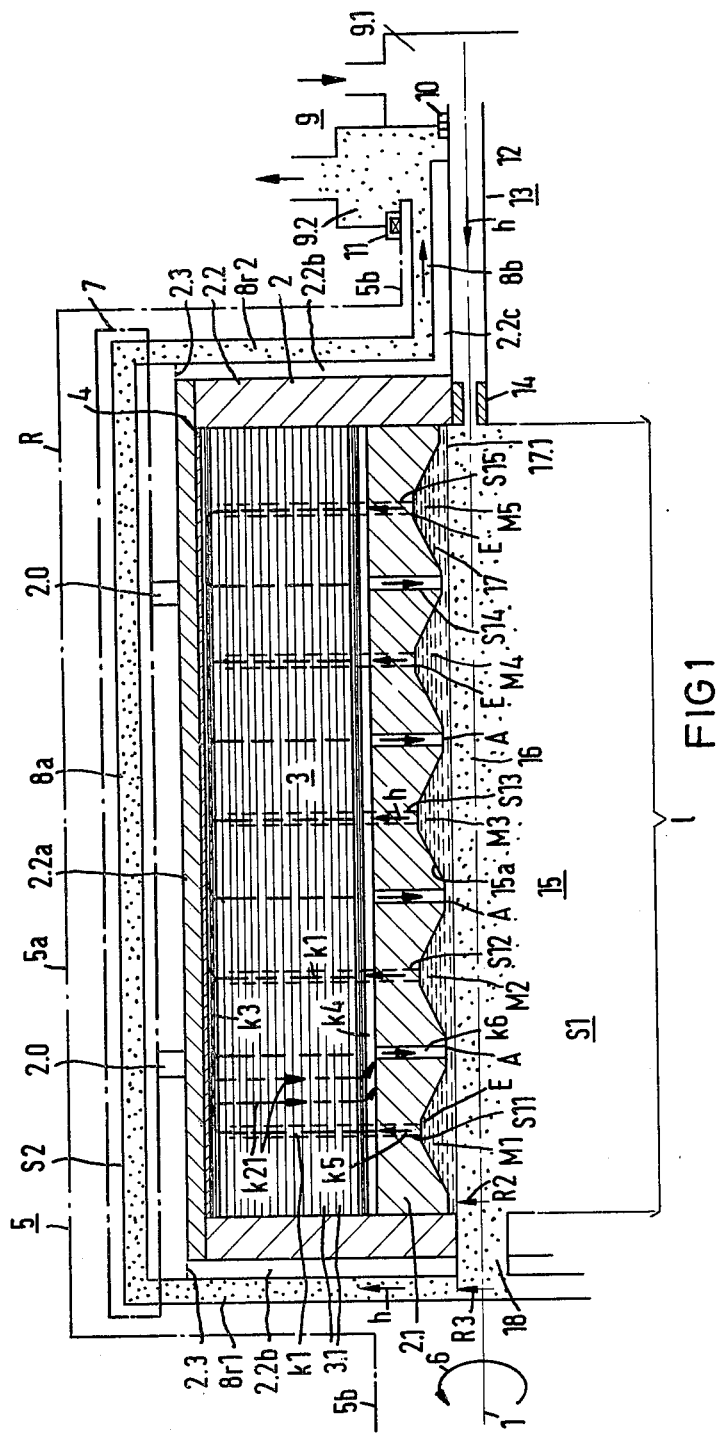
FIG. 1 is a diagrammatic greatly simplified axial-sectional view of the rotor of a turbo-generator with a superconducting field winding according to the invention, the larger part of the lower half being omitted since it is identical with the upper half.

FIG. 5 is a diagrammatic sectional view of a third embodiment example of the invention in a presentation corresponding to FIGS. 4 and 4a with axially oriented mixing chamber sections of sector-shaped or trapezoidal cross section, which are distributed over the inner circumference of the rotor; and FIG. 5a is a reduced cross-sectional view of FIG. 5, taken along the line Va—Va thereof, in the direction of the arrows.

Referring now to the figures of the drawing and first, particularly, to FIG. 1 thereof, there is seen a device for cooling the rotor R of a turbo-generaor, the shaft axis of which is designated with reference numeral 1; for the sake of simplification, the bearings for the rotatable support of the rotor R are not shown. The superconducting field winding 3 with its winding conductors 3.1, is inserted into the slots of the inner part 2.1 of the rotor body 2, which are not visible in detail. The inner part 2.1 of the body 2 with the field winding 3 is surrounded by an internal damper 4 in the form of a copper cylinder. The parts 2.1 and 3 are securely held against centrifugal forces and are surrounded by the cylindrical outer part 2.2 of the rotor body 2, comprising nonmagnetic steel; as indicated at 2.3, the hollow cylindrical enclosure 2.2a of the outer part 2.2 can be shrunk on the disc-shaped end parts 2.2b. The rotating parts of the rotor R, which are to be cooled, are disposed in a vacuum in order to minimize heat influx from the outside. For this purpose, a co-rotating vacuum housing 5 is provided which encloses all parts of the rotor and is indicated by a dot-dash line; it includes the cylindrical body part 5a and the shaft end parts 5b. The rotation arrow 6 indicates that the rotor R revolves. The other arrows h illustrate the flow direction of the helium used for cooling the rotor; the dotted areas surrounding the arrow h are intended to represent the gaseous phase of the helium and the dashed areas above the dots to represents the liquid phase. The self-enclosed heavy dot-dash line 7 designates a zone provided between the rotor body 2 and the outer vacuum housing 5 which contains the cold-shield and the metal cylinder of the external damper. The rotor body 2 is connected to the cold-shield by highly heat-insulating webs 2.0. Since it is sufficient for an understanding of the following discussion, only the outer, axially-oriented canal branch 8a of an outer helium loop S2, which will be discussed later, is shown within the line 7. The helium-connecting head 9 comprises an inlet chamber 9.1 and an outlet chamber 9.2 which are sealed from each other and from the outside by suitable shaft seals 10 and 11. From the inlet chamber 9.1, the phase mixture of the preponderantly liquid helium is transported through the central canal of the shaft, designated as a whole with reference numeral 12, and through the choke 14 into the co-rotating, mixing chamber 15 which is centrally located in the interior of the body 2 and receives the phase mixture of the externally supplied helium; the gaseous phase settles within a central vapor space located coaxially about the shaft 1, and a ring of liquid 17, which is flung against the boundary walls 15a of the mixing chamber 15, is formed concentrically thereto. As will be explained later on, this ring 17 of liquid helium serves to supply a first coolant stream for cooling the field winding 3. A second coolant stream (which is provided from the at least partially evaporated helium for cooling the cold shield) is conducted through the outer loop S2, starting from the central vapor space 16. Specifically, it is conducted through radially oriented loop parts 8r1 of the left-hand end of the machine, through the previously mentioned axially oriented loop parts 8a within the cold- and damper shield 7, again through radially oriented loop parts 8r2 at the other end of the machine, to a coaxial shaft canal 8b and from there to the helium outlet chamber 9.2. The outlet chamber 9.2 leads to a non-illustrated external refrigeration unit, from which the recooled helium is returned in a closed circuit to the inlet chamber 9.1. The stream conducted through the outer loop S2 contains predominantly gaseous phase helium.

According to the invention, the first coolant stream He1 is now conducted through a multiplicity of parallel-connected, open thermal-syphon inner loops S11, S12, S13 . . . etc. designated as a whole with reference numeral S1. Specifically, it is conducted through corresponding cooling canals of the winding, designated as a whole with reference character k, which are subdivided as follows:

Radially oriented feed canals k1 and discharge canals k2, axially oriented outer cooling canals k3 as well as inner slot-bottom canals k4. Furthermore, there are radially oriented cooling canals k21, only one of which is shown for the sake of greater clarity. The cooling canal k21 is only shown for the one thermal-syphon inner loop S11. The canal 21 forms respective branches to the inner slot-bottom canal k4. The canal k4 is in communication with the exit holes k6, while the entrance holes are not in communication with the slot-bottom canal k4 but are shifted a small amount in the circumferential direction and thereby form an aligned extension of the radial canal k1. Accordingly, canal parts which also run at the outer periphery of the field winding 3 in the circumferential direction are provided below the damping cylinder 4 but are not visible in FIG. 1, so that a distribution system flooding the entire field winding with helium is formed at the outer circumference of the field winding 3. Accordingly, the thermal-syphon inner loops 8.1 with their radial input branches k5, k1 and output branches k2, k6 are distributed over the active, i.e., wound length 1 and the circumference of the rotor R. Respective mixing chamber sections M1, M2 to M5 are now assigned to the individual thermal-syphon inner loops S1, i.e., S11, S12, . . . S15.

As can be seen, the sections M1–M5 are distributed over the axial length in accordance with the disposition of the thermal-syphon inner loops S1, and, because they are ring chambers, they are also distributed over the inner circumference of the rotor R. They are concentrically disposed about the central longitudinal axis 1 of the mixing chamber 15, which simultaneously forms a central coolant supply canal. Each of the mixing chamber sections M1, M2 etc., in general called M, has a respective loop entrance point E away from the axis and a loop exit point A near the axis of the respective inner loop S1, as can be seen.

FIG. 2a shows, in addition to FIG. 1, that the cooling canal sections k2 extend on both sides of the coil conductor package 3.2 disposed in the respective conductor slot 2.4 inside th conductor slot 2.4 and lead into the slot-bottom canal k4. It can further be seen that the radially outward-pointing entrance canal k1 runs in the respective tooth region 2.5. The liquid level developing at the boundary surface of the flung-on liquid ring 17 toward the evaporation space 16, as seen in FIGS. 1 and 2, is designated with reference numeral 17.1 and is illustrated in FIG. 2 by small arrows h whch symbolize the transition from the liquid to the gaseous phase of the evaporating helium at the boundary surface.

FIGS. 1 and 2 further show that the central hole of the rotor R in the first embodiment example according to FIGS. 1 to 2a is expanded, for forming the mixing chamber sections S1, by circular slots which are disposed coaxially to the longitudinal rotor axis 1 and are approximately conically tapered in the axial section; the loop exit point A is always disposed in the axial region of the largest width, and the loop entrance point E in the axial region of the smallest width, of the respective mixing chamber section M. In particular, the mixing chamber sections M are formed by circular slots which are trapezoidal in axial cross section.

The operation of the device shown in FIG. 1 is as follows: The helium is fed from the external helium storage at about 4.4 K and 1.2 bar, through the inlet chamber 9.1 of the helium connecting head 9, through the central shaft hole 12 of the shaft 13 and, through Joule-Thomson expansion, through the choke point 14 to the concentric space 15 of the rotating rotor, in which the He-phase mixture forms a flung-on liquid ring 17 which extends over the entire active rotor length 1, due to the rotation of the rotor. With uniform continuous load (normal operation) of the generator, a state of equilibrium between the liquid phase in the space 17 and the gaseous phase of the helium in the space 16 adjusts itself, so that the radius R2 of the liquid level 17.1 can be assumed to be largely constant. The radius R3 of the outlet holes 18 of the mixing chamber 15 is approximately equal to the radius R2, so that predominantly gaseous helium flows from the evaporation space 16 into the outer loop S2 and from there to the outlet chamber 8.2 of the helium connecting head 9; the outer loops, due to the great length of their branches 8a, are oriented predominantly axially, as can be seen, and extend over the entire circumference of the machine.

In this way, effective cooling of the cold- and damper shield 7 is achieved. This encloses the superconducting winding 3 and the rotor body 2 and absorbs the heat flowing-in from the outside, as symbolized by the flow arrow Q, and prevents a larger amount of heat from penetrating into the winding 3. The heat absorption considerably warms up the helium in the cold- and damper shield 7, which brings about vigorous pumping action (self-pumping effect of the rotor R) due to the rotation. This takes splace as a result of the weight difference between the helium columns in the radial canals 8r1 and 8r2 and, because of the radial position of the helium exit canal 8b (corressponding radius, R1). As a result, an underpressure of about 0.3 to 0.4 bar is generated in the concentric evaporation space 16, whereby the He-temperature at the evaporation level 17.1 drops to about 3.2 to 3.4 K. This conventional self-pumping effect alone does not yet lead to a predeterminable directional flow within the inner loops S1 of the field winding 3.

To better understand the invention, it will be assumed for the time being that, according to FIG. 3, we have a thermally and geometrically symmetrical loop S1' with the axis of symmetry 18, the radial canal sections k1' and k2', and the canal section k3' in the circumferential direction. Let the loop be acted upon from the concentric inside space 15 by the liquid helium ring 17 flung-on by rotation. Through the radially outer surface of the inner damper 4 the loop S1 is assumed to be heated by a heat source Q' acting uniformly on the outside surface of the inner damper. Due to the symmetry of the two loop halves, the centrigural force of the liquid columns in the two canal sections K1', K2' is the same on both sides if the rotor rotates ($\omega$=constant). Although circulating flow can occur in the two canal sections k1', k2' due to radial temperature differences, therse do not at first lead to a continuous loop flow according to the thermal-syphon principle and if so, then in a random manner because the flow direction is not predefined.

Coming back to FIGS. 1 to 2a, the following dimensions and functional cycles should be observed for exciting a directional loop flow in the inner loops S1 and for achieving as uniform cooling of the superconducting field winding 3 as possible.

1. The mixing chamber sections M1, M2 etc. have an axial length 1A and a radial height $1_H$ which can be seen especially well in FIG. 2. These dimensions are such that collecting pockets leading into the entrance branches k5, k1 for such coolant components are formed. These are colder than the average temperature of the liquid helium phase and are generated by evaporation of the helium at the liquid level 17.1. These colder coolant components have a higher specific gravity than the warmer ones and get thoroughly mixed with the coolant components present in the mixing chamber sections M1, 2, 3 . . . because larger centrifugal forces act on them. Due to the shape of the collecting funnels, a considerably larger effective range $1_{A1}$ of the evaporation surface is associated with the entrance branches K5 than, for instance, with the exit branches K6 having a length $1_{A2}$ ($1_{A1} > 1_{A2}$). This results in a different He-state over the radial range $1H$ in the exist branches than in the collecting funnel M1, 2, 3 . . . He-pressure differences result from weight differences between the entrance branches *K*5, *K*1 on the one hand and the exit branches *K*2, *K*6 on the other hand, of the respective inner top S1. Since helium already has a very small flow resistance, a very small pressure difference suffices to produce a directional flow in the relatively short thermal-syphon inner loops S1 of the winding 3. The relatively colder helium is thus transported from the radially outermost point E of the respective chamber M1, M2 outward through the entrance branches k5, k1. After flowing through the axial canals k3, the helium is deflected and returned through the exit branches k2, k6 radially inwardly into the concentric evaporation space 17 where, as mentioned before, the exit opening A are disposed at the radially innermost point of the chamber configuration. The pressure difference required for a directional helium loop flow is therefore obtained by a different geometrical shape of the mixing chamber sections M in their input and their output region. The intensity of the helium evaporation at the liquid level 17.1 is a function of the underpressure generated by the rotor R itself. When starting from a standstill and moving to the operating speed, the underpressure changes in proportion to the square of the speed. In operation, the underpressure is also influenced by the losses produced. Because of the removal of the heat of evaporation from the surface layer of the helium level, cold helium particles which gain weight are generated and thereby trigger or fan-up a radially outward-directed flow and the above-described thermal-syphon loop flow. The fanning-up or kindling occurs when the rotor is started (necessary condition) and is initially independent of electrical influences.

2. The heat introduced into the winding 3 from the outside throgh the webs 2.0 (local mechanical connection points) and by radiation, is distributed largely uniformly over the surface of the rotor body 2 and therefore, the winding 3. Since the winding 3 is shot through by a multiplicity of thermal-syphon inner loops S1, a large number of these inner loops is thereby also utilized for heat removal; this heat, which flows to the winding 3 from the outside, has a flow-increasing effect on the thermal-syphon loop flow. The thermal-syphon loop flow, enforced when the rotor is being started up, is thus aided by the heat flowing-in from the outside, which otherwise influences mainly the region of the connecting points 2.0 of the winding 3. The external heat source Q has no effect on a loop without flow, as explained with reference to FIG. 3, but it does have an enhancement effect on a directional loop flow. This is because while the cold, radially outward-directed helium flow is practically not influenced by the external heat source, the inward-directed helium flow receives heat, and its specific gravity is thereby reduced.

3. A third flow-enhancing effect acting on the thermal-syphon loop flow is logically exerted by the fact that in the energized state of the winding 3, electric losses must be removed. This behavior results in a self-regulating cooling effect. The larger the locally occurring losses (heat pockets), the more are the respective thermal-syphon inner loops aided in their predetermined flow direction.

In the second embodiment example according to FIGS. 4 and 4a, substantially rectangular circular slots are provided in the axial cross section for the mixing chamber sections M' (in the figures, the mixing chamber sections M2', M3' and, partially, M4' are visible). The canals k5 for the loop entrances are conducted here, starting from the radially outer ring wall e1, through the body to the winding. Additionally, the canals k6 for the loop exits A are conducted within ring extension a1 left standing between respective, axially adjacent mixing chamber sections M', radially inward to the respective mixing chamber section, coming from the winding. Otherwise, the construction of this embodiment example is like that according to FIGS. 1 to 2a.

In the third embodiment example according to FIGS. 5 and 5a, substantially trapezoidal or sector-shaped axial slots are provided in the radial cross section for the mixing chamber sections M". The canals k5 for the loop entrances E are brought here from the radially outer transverse wall e2 through the body to the winding. The canals k6 for the loop exits 4 are conducted within axial webs a2 left standing between respective radially adjacent mixing chamber sections M", radially inwardly to the respective mixing chamber sections M" or the vapor space 16. The mixing chamber sections of the chamber configuration of FIGS. 5 and 5a could also be called axial mixing chambers. This chamber configuration is particularly well suited for cooling the coil head region of the field winding, where transverse conductors of the winding 3 extending in the circumferential direction, but not shown in detail, are disposed. Here, the thermal-syphon inner loops are therefore formed by two entrance and exit branches each, spaced from each other in the circumferential direction, and by a loop part extending in the circumferential direction which is not visible in FIGS. 5 and 5a. The mixing chamber configurations shown in FIGS. 4 and 4a and FIGS. 1 to 2a, respectively, are particularly suited for cooling the axial coil zone of the field winding 3, as can be seen from FIG. 1.

Besides its electrical properties, the copper cylinder of the inner damper 4 which is visible in FIG. 1 provides for a good axial and tangential distribution of the heat flowing-in via the connecting points 2.0. Thereby a multiplicity of thermal-syphon inner loops is utilized for the cooling, whereby local hot spots are largely suppressed. Besides this, the inner damper 4 acts as an electrical damper which prevents alternating fields from penetrating into the region of the superconducting field winding 3.

There are claimed:

1. Arrangement for cooling the rotor of an electric machine, comprising a superconducting field winding, at least one cold shield surrounding said field winding, and a co-rotatable mixing chamber containing a phase mixture of coolant fed thereto from outside said rotor, said coolant mixture having a liquid level and branching into a first stream of liquid coolant for cooling said field winding and a second stream of at least partially evaporated coolant for cooling said cold shield, said second coolant stream being conducted from said mixing chamber through said cold shield and returned from the machine in an outer loop, said first coolant stream being conducted through a multiplicity of parallel-connected open thermal-syphon inner loops from said mixing chamber, through cooling canals subdivided into corresponding cooling canal sections of winding conductors of said field winding, and returned to said mixing chamber, said coolant in said inner and outer loops being transported by the self-pumping effect of rotation of said rotor, said inner loops having radial entrance and exit branches distributed over the length and circumference of said rotor and field winding, mixing chamber sections associated with said respective inner loops, said mixing chamber sections having a given axial length and radial height forming collecting pockets leading into said entrance branches for coolant which is colder than the average temperature of the liquid phase and produced by evaporation at said liquid level, means for fanning-up a directional thermal-syphon loop flow from weight and pressure differences of said radial coolant canal sections of said respective inner loops, said mixing chamber sections being distributed over the axial length and inner circumference of said rotor in accordance with the placement of said thermal-syphon inner loops, and being disposed concentrically about the central longitudinal axis of said mixing chamber of said rotor, each of said mixing chamber sections having at least one loop entrance point spaced from the axis, and at least one loop exit point in vicinity of a thermal-syphon inner loop.

2. Arrangement for cooling the rotor of an electric machine, comprising a superconducting field winding, at least one cold shield surrounding said field winding, and a co-rotatable mixing chamber containing a phase mixture of coolant fed thereto from outside said rotor, said coolant mixture having a liquid level and branching into a first stream of liquid coolant for cooling said field winding and a second stream of at least partially evaporated coolant for cooling said cold shield, said second coolant stream being conducted from said mixing chamber through said cold shield and returned from the machine in an outer loop, said first coolant stream being conducted through a multiplicity of parallel-connected open thermal-syphon inner loops from said mixing chamber, through cooling canals subdivided into corresponding cooling canal sections of winding conductors of said field winding, and returned to said mixing chamber, said coolant in said inner and outer loops being transported by the self-pumping effect of rotation of said rotor, said inner loops having radial entrance and exit branches distributed over the length and circumference of said rotor and field winding, mixing chamber sections associated with said respective inner loops, said mixing chamber sections having a given axial length and radial height forming collecting pockets leading into said entrance branches for coolant which is colder than the average temperature of the liquid phase and produced by evaporation at said liquid level, means for fanning-up a directional thermal-syphon loop flow from weight and pressure differences of said radial coolant canal sections of said respective inner loops, said mixing chamber sections being distributed over the axial length and inner circumference of said rotor in accordance with the placement of said thermal-syphon inner loops, and being disposed concentrically about the central longitudinal axis of said mixing chamber of said rotor, each of said mixing chamber sections having at least one loop entrance point spaced from the axis, and at least one loop exit point in vicinity of a thermal-syphon inner loop, and including circular slots formed in said mixing chamber of said rotor for enlarging said mixing chamber and forming said mixing chamber sections, said circular slots being disposed coaxially to the longitudinal axis of said mixing chamber and having approximately conically tapered axial cross sections, said loop exit point being disposed in the axial vicinity of the greatest axial width of said mixing chamber section, and said loop entrance point being disposed in the axial vicinity of the smallest radial width of said mixing chamber section.

3. Arrangement according to claim 2, wherein said mixing chamber sections are formed by circular slots of trapezoidal axial cross sections.

4. Arrangement for cooling the rotor of an electric machine, comprising a superconducting field winding, at least one cold shield surrounding said field winding, and a co-rotatable mixing chamber containing a phase mixture of coolant fed thereto from outside said rotor, said coolant mixture having a liquid level and branching into a first stream of liquid coolant for cooling said field winding and a second stream of at least partially evaporated coolant for cooling said cold shield, said second coolant stream being conducted from said mixing chamber through said cold shield and returned from the machine in an outer loop, said first coolant stream being conducted through a multiplicity of parallel-connected open thermal-syphon inner loops from said mixing chamber, through cooling canals subdivided into corresponding cooling canal sections of winding conductors of said field winding, and returned to said mixing chamber, said coolant in said inner and outer loops being transported by the self-pumping effect of rotation of said rotor, said inner loops having radial entrance and exit branches distributed over the length and circumference of said rotor and field winding, mixing chamber sections associated with said respective inner loops, said mixing chamber sections having a given axial length and radial height forming collecting pockets leading into said entrance branches for coolant which is colder than the average temperature of the liquid phase and produced by evaporation at said liquid level, means for fanning-up a directional thermal-syphon loop flow from weight and pressure differences of said radial coolant canal sections of said respective inner loops, said mixing chamber sections being distributed over the axial length and inner circumnference of said rotor in accordance with the placement of said thermal-syphon inner loops, and being disposed concentrically about the central longitudinal axis of said mixing chamber of said rotor, each of said mixing chamber sections having at least one loop entrance point spaced from the axis, and at least one loop exit point in vicinity of a thermal-syphon inner loop, and including substantially rectangular circular slots formed in said mixing chamber to form said mixing chamber sections, ring extensions left standing between respective adjacent mixing chamber sections, and a radially outer ring wall for said mixing chamber sections, said canals for said loop entrances being conducted from said radially outer ring wall through said body to said winding, and said canals for said loop exits being conducted within said ring extensions, from said winding radially inwardly to said respective mixing chamber sections.

5. Arrangement for cooling the rotor of an electric machine, comprising a superconducting field winding, at least one cold shield surrounding said field winding, and a co-rotatable mixing chamber containing a phase mixture of coolant fed thereto from outside said rotor, said coolant mixture having a liquid level and branching into a first stream of liquid coolant for cooling said field winding and a second stream of at least partially evaporated coolant for cooling said cold shield, said second coolant stream being conducted from said mixing chamber through said cold shield and returned from the machine in an outer loop, said first coolant stream being conducted through a multiplicity of parallel-connected open thermal-syphon inner loops from said mixing chamber, through cooling canals subdivided into corresponding cooling canal sections of winding conductors of said field winding, and returned to said mixing chamber, said coolant in said inner and outer loops being transported by the self-pumping effect of rotation of said rotor, said inner loops having radial entrance and exit branches distributed over the length and circumference of said rotor and field winding, mixing chamber sections associated with said respective inner loops, said mixing chamber sections having a given axial length and radial height forming collecting pockets leading into said entrance branches for coolant which is colder than the average temperature of the liquid phase and produced by evaporation at said liquid level, means for fanning-up a directional thermal-syphon loop flow from weight and pressure differences of said radial coolant canal sections of said respective inner loops, said mixing chamber sections being distributed over the axial length and inner circumference of said rotor in accordance with the placement of said thermal-syphon inner loops, and being disposed concentrically about the central longitudinal axis of said mixing chamber of said rotor, each of said mixing chamber sections having at least one loop entrance point spaced from the axis, and at least one loop exit point in vicinity of a thermal-syphon inner loop, and including substantially trapezoidal-shaped axial slots formed in said mixing chamber to form said mixing chamber sections, a radially outer transverse wall for said mixing chamber sections, and axial webs left standing between respective tangentially adjacent mixing chamber sections, said canals for said loop entrances being conducted from said transverse wall through said body to said winding, and said canals for said loop exits being conducted within said axial webs radially inwardly to said mixing chamber sections.

6. Arrangement according to claim 5, wherein said rotor has an axial coil having heads, said mixing chamber sections in vicinity of said axial coil of said rotor are formed as ring mixing chambers following each other in axial direction, and said ring mixing chambers follow each other in circumferential direction in vicinity of said coil heads.

* * * * *